(12) United States Patent
Huang et al.

(10) Patent No.: US 7,042,659 B2
(45) Date of Patent: May 9, 2006

(54) OPTICAL LENS, DESIGN METHOD FOR THE OPTICAL LENS AND LENS SYSTEM USING THE OPTICAL LENS

(75) Inventors: Cheng-Yu Huang, Taoyuan (TW); Shyan-Mun Wang, Hsinchu (TW); Chiao-Hsiang Chen, Taoyuan (TW)

(73) Assignee: Axon Technologies Corp., Taoyuan (TW)

( * ) Notice: Subject to any disclaimer, the term of this patent is extended or adjusted under 35 U.S.C. 154(b) by 0 days.

(21) Appl. No.: 10/710,347

(22) Filed: Jul. 2, 2004

(65) Prior Publication Data
US 2006/0012890 A1 Jan. 19, 2006

(51) Int. Cl.
*G02B 9/00* (2006.01)
*G02B 9/04* (2006.01)

(52) U.S. Cl. .............. 359/796; 359/793; 359/794; 359/795

(58) Field of Classification Search ........... 359/796, 359/793, 794, 795, 691, 692, 717, 716, 690, 359/689, 784
See application file for complete search history.

(56) References Cited

U.S. PATENT DOCUMENTS 5,724,193 A * 3/1998 Hirakawa ............... 359/691
2004/0105173 A1 * 6/2004 Yamaguchi et al. ....... 359/793

* cited by examiner

*Primary Examiner*—Timothy Thompson
(74) *Attorney, Agent, or Firm*—Jianq Chyun IP Office

(57) ABSTRACT

An optical lens is described. The optical lens comprises a barrel, a first lens and a second lens. The barrel has a light incident opening, and a receiving space, wherein the receiving space is successive to the light incident opening. Additionally, the first lens is disposed in the receiving space, and the first lens is partially exposed by the light incident opening, wherein the first lens has a first annular conical surface at the outer rim of the first lens. Further, the second lens is disposed in the receiving space, and embedded with the first lens. The second lens has a second annular conical surface on outer rim of the second lens, and the first annular conical surface is embedded with the second annular conical surface. Accordingly, the optical lens has better alignment accuracy and assembly performance.

12 Claims, 5 Drawing Sheets

OPTICAL LENS, DESIGN METHOD FOR THE OPTICAL LENS AND LENS SYSTEM USING THE OPTICAL LENS

BACKGROUND OF INVENTION

1. Field of the Invention

This invention relates in general to a lens. More specifically, the present invention relates to an optical lens, a design method for the optical lens and a lens system using the optical lens.

2. Description of Related Art

In modern information society, a variety of optical systems, such as telescopes, cameras, microscopes and optical projection systems, is widely used in our everyday life. Lens in the aforementioned optical systems usually determines the image quality, and therefore, the conventional lens structure is further described for understanding function of lens.

FIG. 1 shows a cross-sectional view of a conventional lens. In FIG. 1, the lens 100 comprises a barrel 110, a first lens 120, a baffle 130, a second lens 140, a fixed plate 150, a filter 160, a sensor covering plate 170 and a charge coupled device (CCD) sensor 180. The barrel 110 has a light incident opening 110a and a receiving space 110b, and the light incident opening 110 is successive to the receiving space 110b. The first lens 120, the baffle 130, the second lens 140 and the fixed plate 150 are sequentially arranged within the receiving space 110b. The light incident opening 110a exposes a portion of the first lens 120 and a light outgoing opening 150a is formed on the fixed plate 150 to expose a portion of the second lens 140. The CCD sensor 180 is disposed at a light path behind the fixed plate 150. The sensor covering plate 170 is used to cover the CCD sensor 180 and is located on a light path between the fixed plate 150 and the CCD sensor 180. The filter 160 is disposed on a light path between the fixed plate 150 and the CCD sensor 180.

It should be noticed that a key step of making the conventional lens 100 is the alignment accuracy between the first lens 120 and the second lens 140. In an idea condition, the optical axis of the first lens 120 and the optical axis of the second lens 140 should be aligned. However, due to an assembling error, the optical axis of the first lens 120 and the optical axis of the second lens 140 will be misaligned. An eccentric shifting extent between the optical axis of the first lens 120 and the optical axis of the second lens 140 will affect the optical property of the lens 100. Referring to an enlarged portion shown in FIG. 1, in the conventional lens 100, the first lens 120 and the second lens 140 are positioned to align each other by arranging the first lens 120 and the second lens 140 against the inner wall of the barrel 110. Therefore, the processing accuracy of the inner wall of the barrel 110 will affect the alignment accuracy of the first lens 120 and the second lens 140. Currently, the barrel 110 is processed and worked by computer numerical control lathe (CNC lathe) or computer numerical control boring machine (CNC boring machine). The processing accuracy of the inner wall of the barrel 110 is only up to about 10 microns. Therefore, an alignment error between the first lens 120 and the second lens 140 is at least 5 microns or more. The conventional lens 100 using the barrel positioning method cannot be applied to high accuracy optical instruments. The optical property of the conventional lens 100 is further described according to an optical simulation analysis.

FIG. 2 is a diagram illustrating an optical simulation analysis for the conventional lens. A light ray 190 passes through in turns the light incident opening 110a of the barrel 110, the first lens 120, an opening of the baffle 130, the second lens 140, the light outgoing opening 150a of the fixed plate 150, the filter 160 and the sensor covering plate 170, and then is incident to the CCD sensor 180. A portion of the light ray 190 received by the CCD sensor 180 becomes an image light source 190a, and a portion of the light ray 190 becomes useless light 190b. The useless light will affect the image quality. The useless light 190b is mainly formed by that a portion of the light ray 190 is reflected by the filter 160 or the sensor covering plate 170 and then the reflected light is further reflected by fixed plate 150 or an interface (the baffle plate 130) between the first lens 120 and the second lens 140. Although the baffle plate 130 between the first lens 120 and the second lens 140 is made of black and low reflectivity material and used to absorb the useless light 190b, but the improvement by using the baffle plate 130 is not much.

SUMMARY OF INVENTION

According to the foregoing description, an object of this invention is to provide an optical lens having a better alignment accuracy between the lenses so as to improve the eccentric shifting issue of the optical axes of the lenses.

It is another object of this invention to provide a lens system having a better alignment accuracy between the lenses so as to improve the eccentric shifting issue of the optical axes of the lenses.

It is another object of this invention to provide a design method for an optical lens capable of increasing the optical property of the optical lens.

According to the objects mentioned above, the present invention provides an optical lens comprising a barrel, a first lens and a second lens. The barrel has a light incident opening and a receiving space, wherein the light incident opening is successive to the receiving space. The first lens is arranged in the receiving space and has a first annular conical surface that is located at an outer rim of the first lens, wherein the light incident opening exposes a portion of the first lens. The second lens is arranged in the receiving space and has a second annular conical surface that is located at an outer rim of the second lens, wherein the second lens is embedded with the first lens in a manner that the first annular conical surface is embedded with the second annular conical surface.

In one embodiment of the present invention, the first annular conical surface of the first lens can comprise a concave and the second annular conical surface of the second lens comprises a convex, wherein the concave is embedded with the convex.

In one embodiment of the present invention, the first annular conical surface of the first lens can comprise a convex and the second annular conical surface of the second lens comprises a concave, wherein the convex is embedded with the concave.

In one embodiment of the present invention, the optical lens can further comprise a fixed plate arranged within the receiving space against the second lens. A light outgoing opening is further formed on the fixed plate to expose a portion of the second lens.

In one embodiment of the present invention, the optical lens can further comprise an image capturing device arranged on a light path behind the fixed plate.

In one embodiment of the present invention, the optical lens can further comprise a sensor covering plate for covering onto the image capturing device arranged on a light path behind the fixed plate. The sensor covering plate is arranged on a light path between the fixed plate and the image capturing device.

In one embodiment of the present invention, the optical lens can further comprise a filter arranged on a light path between the fixed plate and the image capturing device.

In one embodiment of the present invention, materials of the first lens and the second lens can be glass or plastic.

The present invention further provides an lens system, comprising a first lens and a second lens for example. The first lens has a first annular conical surface that is located at an outer rim of the first lens, and the second lens has a second annular conical surface that is located at an outer rim of the second lens. The second lens is embedded with the first lens in a manner that the first annular conical surface is embedded with the second annular conical surface.

In the above lens system, materials of the first lens and the second lens can be glass or plastic for example.

The present invention further provides a design method for an optical lens, comprising following steps for example. A computer analysis model for the optical lens is provided, in which the computer analysis model for the optical lens comprises at least a plurality of lenses and an image capturing device that is located on a light path behind the lenses. A reference image is projected to the lenses to form an image on the image capturing device. The image is analyzed to obtain a distribution of a useless light of the image and a useless light reflection region of the lenses is obtained. An angle formed by an interface of the lenses and optical axes of the lenses is corrected to reduce a light strength of the useless light of the image.

In the above design method, the interface of the lenses of the computer analysis model is perpendicular to the optical axes of the lens.

In the above design method, correcting the angle formed by the interface of the lenses and the optical axes of the lenses comprises changing the interface of the lens to annular conical surfaces, for example.

In one embodiment of the present invention, analyzing the image can further comprise comparing the image and the reference image to obtain the useless light of the image, for example.

According to the embodiments of the present invention, since the first and the second lenses are assembled by embedding the first and the second annular conical surfaces with each other, the lens system of the present invention can have a better assembly accuracy. By embedding the first and the second annular conical surfaces with each other to assemble the first and the second lenses, the optical lens of the present invention can have a higher assembly performance and accuracy. In addition, the optical lens can be designed with better optical properties by using the optical simulation analysis and changing the incline angle formed by the first and the second annular conical surfaces.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION

Figure 3:
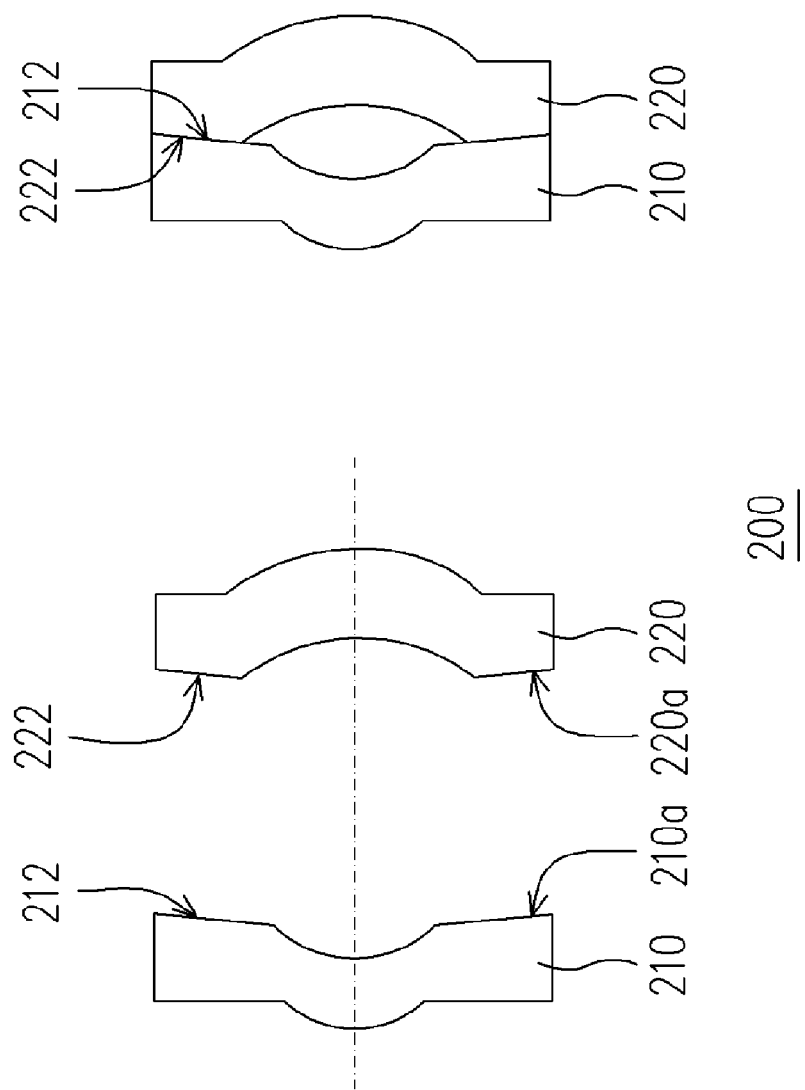
FIG. 3 schematically shows a cross-sectional view of a lens system according to one embodiment of the present invention.

FIG. 3 schematically shows a cross-sectional view of a lens system according to one embodiment of the present invention. In FIG. 3, the lens system 200 comprises a first lens 210 and a second lens 220, for example. The first lens 210 has a first annular conical surface 212 located at the outer rim of the first lens 210. The second lens 220 is embedded with the first lens 210, and has a second annular conical surface 222 located at the outer rim of the second lens 220. The first annular conical surface 212 and the second annular conical surface 222 are embedded with each other. Therefore, the first lens 210 and the second lens 220 are assembled by embedding first annular con surface 212 with the second annular con surface 222. In this way, the assembling accuracy of the first lens 210 and the second lens 220 is increased, and furthermore, assembling the first lens 210 and the second lens 220 becomes easier and more convenient.

Referring to FIG. 3, materials of the first lens 210 and the second lens 220 can be transparent glass, transparent plastic or other transparent material, for example. The first lens 210 and the second lens 220 can be ground by a diamond grinding machine, so that the shape accuracy of the first annular conical surface 212 of the first lens 210 and the second annular conical surface 222 of the second lens 220 can be controlled to 0.2 μm or less. The assembled first lens 210 and the second lens 220 have an extremely small alignment error because the shape accuracy of the first annular conical surface 212 of the first lens 210 and the second annular conical surface 222 of the second lens 220 can be controlled to 0.2 μm or less. In addition, since the lens system 200 of the present invention has a better assembling accuracy, the lens system 200 has smaller optical errors, including an eccentric error, a heeling error and a perpendicularity of the optical axis and the lens.

As described above, since the lens system 200 of the present invention has a superior assembling accuracy, the lens system 200 is able to be applied to various accurate optical instruments, like laser apparatus, microscope, telescope and snoopscope, etc. The present invention does not limit grinding the first lens 210 and the second lens 220 by using a diamond grinding machine, a laser machining center or other high precise machining centers to increase a sharp accuracy of the first lens 210 and the second lens 220 and further to increase an alignment accuracy between the lenses. Additionally, if the material of the first lens 210 and the second lens 220 is plastic, it is not necessary to use a machining center to make the first lens 210 and the second lens 220. Injection molding can be used to make plastic lens.

Referring to FIG. 3, currently the industry usually uses a Form TalySurf (FTS) apparatus to measure a surface profile, and then provides the measure surface profile of the lens to an optical simulation analysis. Regarding the profile of the first lens 210, if the measuring line passes through the lens center of the first lens 210, the profile line corresponding to the first annular conical surface 212 should be a line. Furthermore, according to geometry, if the measuring line does not pass through the lens center of the first lens 210, the profile line corresponding to the first annular conical surface 212 should be a curve. Therefore, the measurer can determine whether the measuring line passes through the lens center of the first lens 210 or not by determining the profile line corresponding to the first annular conical surface 212 is a line or not. For the profile of the first lens 120 of the conventional lens 100, no matter whether the measure line passes through the lens center of the first lens 120 or not, the measurer cannot get information from measured data. However, the measured result has errors if the measuring line fails to pass through the lens center.

As described above, the lens system of the present invention uses an alignment method of embedding the first annular conical surface 212 with the second annular conical surface. In this way, a higher alignment accuracy can be provided and the optical property of the lens system 200 can be increased. Regarding the measurement of the surface profile of the lens, the first annual conical surface 212 and the second annual conical surface 222 can be a criteria for determining whether the measuring line passes through the lens centers of the first lens 210 and the second lens 220. The designer can understand errors between the design specification and the real specification of the lens system 200 according to the measured result so as to improve the optical quality of the lens system 200. In addition, the lens system 200 of the present invention is not limited to the assembly of the first lens 210 and the second lens 220. The lens system 200 can be used to assemble a plurality of lenses. Therefore, the lens system of the present invention can be applied to various optical instruments and apparatuses to increase their optical properties.

Figure 4:
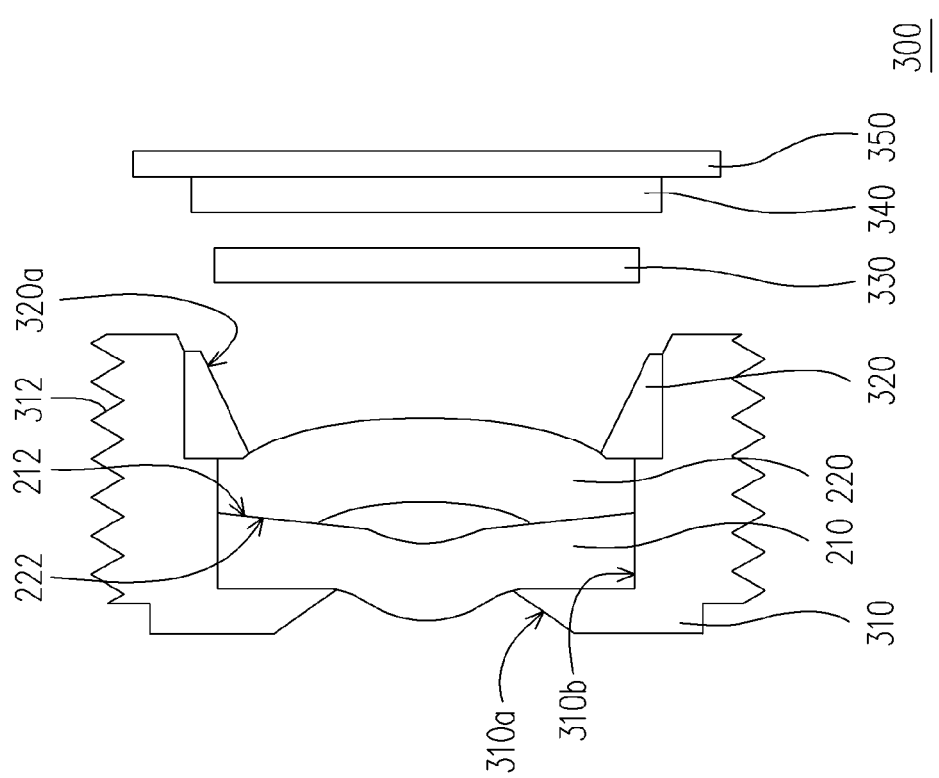
FIG. 4 schematically shows a combination of an optical lens according to one embodiment of the present invention.

FIG. 4 schematically shows a combination of an optical lens according to one embodiment of the present invention. The optical lens 300 comprises a barrel 310, a first lens 210, a second lens 220, a fixed plate 320, a filter 330, a sensor covering plate 340 and an image capturing device 350. The barrel 310 has a light incident opening 310a and a receiving space 310b, for example, and the light incident opening 310a is successive to the receiving space 310b. The first lens 210 is arranged within the receiving space 310b, and the light incident opening 310a exposes a portion of the first lens 210. The second lens 220 is arranged within the receiving space 310b to scarf with the first lens 210. The second annular conical surface 222 of the second lens 220 is embedded with the first annular conical surface 212 of the first lens 210.

The fixed plate 320 is arranged within the receiving space 310b against the second lens 220. The fixed plate 320 has a light outgoing opening 320a to expose a portion of the second lens 220. The image capturing device 350 is disposed on a light path behind the fixed plate 320, and the filter 330 is arranged on a light path between the fixed plate 320 and the image capturing device 350. Furthermore, the sensor covering plate 340 is covered onto the image capturing device 350, and disposed on a light path between the fixed plate 320 and the image capturing device 350. The fixed plate 320, the filter 330, the sensor covering plate 340 and the image capturing device 350 are optional elements.

Referring to FIG. 4, the material of the barrel 310 and the fixed plate 320 includes plastic, for example. The filter 340 can be an IR filter or other filters. The image capturing device 350 for example can be a CCD sensor, a CMOS or other image capturing sensors. In order to assemble the optical lens 300 conveniently, a screw thread is further formed on the outer surface of the barrel 310, but the screw thread is an optional choice. The first annular conical surface 212 of the first lens 210 can be a concave and the second annular conical surface 222 of the second lens 220 can be a convex. Alternatively, the first annular conical surface 212 of the first lens 210 can be a convex and the second annular conical surface 222 of the second lens 220 can be a concave. The optical lens 300 of the present invention is described according to an optical simulation analysis performed to the optical lens 300.

Figure 5:
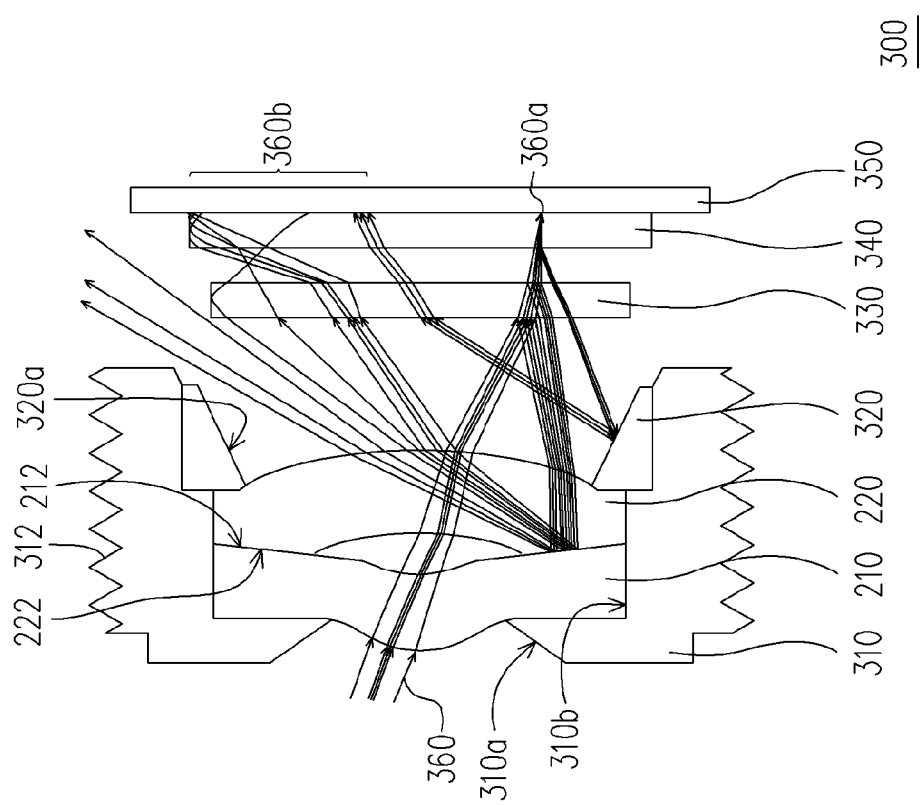
FIG. 5 is a diagram illustrating an optical simulation analysis for the optical lens according to the embodiment of the present invention.

FIG. 5 is a diagram illustrating an optical simulation analysis for the optical lens according to the embodiment of the present invention. A light ray 360 passes through in turns the light incident opening 310a of the barrel 310, the first lens 210, the second lens 140, the light outgoing opening 320a of the fixed plate 320, the filter 330 and the sensor covering plate 340, and then is incident to the CCD sensor 350. A portion of the light ray 360 received by the CCD sensor 350 becomes an image light source 360a, and a portion of the light ray 360 becomes useless light 360b. A portion of the light ray 360 is reflected by the filter 330 or the sensor covering plate 340, and then incident to the interface of the first lens 210 and the second lens 220. The incline surface formed by the first annular conical surface 212 and the second annular conical surface 222 can scatter the light ray reflected by the filter 330 or the sensor covering plate 340 so as to reduce the light strength of the useless light 360b.

Figure 1:
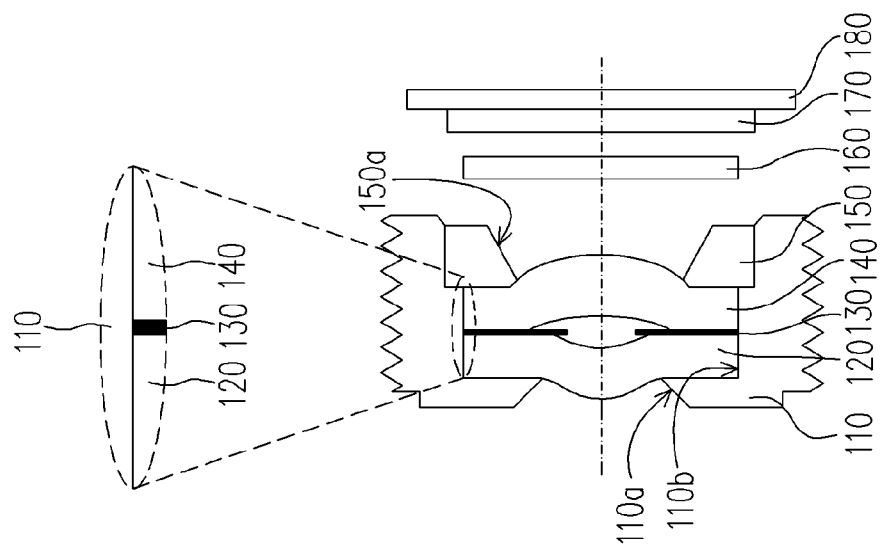
FIG. 1 shows a cross-sectional view of a conventional lens.
Figure 2:
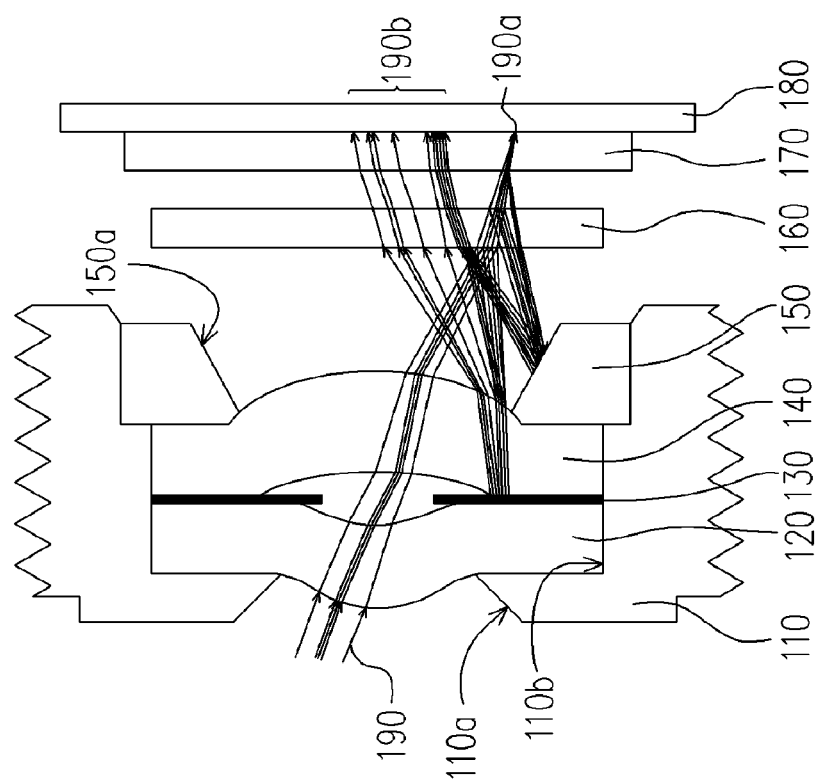
FIG. 2 is a diagram illustrating an optical simulation analysis for the conventional lens.

Referring to FIGS. 2 and 5, as compared with the conventional lens 100, the lens 300 of the present invention uses the incline surface formed by the first annular conical surface 212 and the second annular conical surface 222 to scatter the light ray reflected by the filter 330 or the sensor covering plate 340 so that the light strength of the useless light 360b is effectively reduced and the image quality is improved. Furthermore, the first lens 120 and the second lens 140 of the conventional lens 100 are aligned by arranged them to be against the inner wall of the barrel 110. In the present invention, the first annular conical surface 212 is embedded with the second annular conical surface 222 to align the first lens 210 and the second lens 220 of the lens 300 so as to increase not only the alignment accuracy of the first lens 210 and the second lens 220 but also the optical property of the lens 300. In addition, the conventional lens 100 uses the baffle 130 to reduce the strength of the useless light. In contrast, the present invention does not need the baffle, and the strength of the useless light can be reduced by the incline surface formed by the first annular conical surface 212 and the second annular conical surface 222. In this way, it has a better effect of reducing the useless light and the baffle cost can be saved. However, the present invention can also use a baffle to further reduce the strength of the useless light 360b.

As shown in FIG. 5, the incline surface formed by the first annular conical surface 212 and the second annular conical surface 222 of the lens 300 functions to reduce the useless light 360b. The ability of reducing the useless light 360b relates to an incline angle of the incline surface. Therefore, the design method of the lens 300 comprises several steps for example. The computer analysis model of the conventional lens 100 (FIG. 2) is first established. Then, the light ray 190 is projected into the conventional lens 100 to form the image light source 190a and the useless light 190b on the image capturing device 180. According to the distribution of the useless light 190b, reflection regions of the useless light due to the lenses 120, 140 are obtained, wherein the interface of the lenses 120, 140 are perpendicular to the light axis.

According to data (reflection regions of the useless light) analyzed from the computer analysis model of the conventional lens 100, a computer analysis model (FIG. 5) of the lens 300 of the present invention is established. The interface of the lenses 210, 220 (for example, the first annular conical surface 212 and the second annular conical surface 222) and the light axis of the lenses 210, 220 form an angle. Then, the light ray 360 is projected to the lenses 210, 220 to form the image light source 360a and the useless light 360b on the image capturing device 350. The light strength and the distribution of the useless light 360b are analyzed. The angle between the light axis and the interface of the lenses 210, 220 are repeatedly changed to analyze the light strength and the distribution of the useless light 360b until an optimized angle is obtained.

The incline surface formed by the first lens 210 and the second lens 220 is not limited to the manner shown in FIGS. 3 to 5. The first annular conical surface 212 can be changed to a convex and the second annular conical surface 222 is correspondingly changed to a concave.

The optical lens and its design method and lens system of the present invention have following advantageous. In the conventional assembling method of using the barrel, the processing accuracy of the inner wall of the barrel is about 10 μm. However, according to the present invention, the lenses are assembled by embedding the first and the second annular conical surfaces with each other, and the processing accuracy of the first and the second annular conical surfaces is about 0.2 μm. Therefore, the lens system and the optical lens of the present invention can have a better alignment accuracy only with an error of about 0.2 μm. Furthermore, as the processing accuracy of the first and the second lenses increases, the alignment accuracy between the first and the second lenses also increases.

Furthermore, the method of embedding the first and the second annular conical surfaces with each other is not only suitable for two lenses but also for multiple lenses. Therefore, the alignment accuracy among the multiple lenses can be increased.

According to the lens of the present invention, the measurer can measure the real lens profile according to whether the profile line corresponding to the first annular conical surface and the second annual conical surface is straight line or not.

Compared with the conventional technology, the method of embedding the first and the second annular conical surfaces with each other can obtain a better optical property and have a higher assembly performance.

According to the design method of the present invention, the researchers can design optical lens with better optical properties by using the optical simulation analysis and changing the incline angle formed by the first and the second annular conical surfaces.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

The invention claimed is:

1. An optical lens, comprising: a barrel, having a light incident opening and a receiving space, wherein the light incident opening is successive to the receiving space; a first lens, arranged in the receiving space and having a first annular conical surface that is located at an outer rim of the first lens, wherein the light incident opening exposes a portion of the first lens; and a second lens, arranged in the receiving space and having a second annular conical surface that is located at an outer rim of the second lens, wherein the second lens is embedded with the first lens in a manner that the first annular conical surface is embedded with the second annular conical surface, wherein the first annular conical surface of the first lens comprises a concave and the second annular conical surface of the second lens comprises a convex, wherein the concave is embedded with the convex.

2. An optical lens, comprising; a barrel, having a light incident opening and a receiving space, wherein the light incident opening is successive to the receiving space; a first lens arranged in the receiving space and having a first annular conical surface that is located at an outer rim of the first lens, wherein the light incident opening exposes a portion of the first lens; and a second lens, arranged in the receiving space and having a second annular conical surface that is located at an outer rim of the second lens, wherein the second lens is embedded with the first lens in a manner that the first annular conical surface is embedded with the second annular conical surface, wherein the first annular conical surface of the first lens comprises a convex and the second annular conical surface of the second lens comprises a concave, wherein the convex is embedded with the concave.

3. An optical lens, comprising; a barrel, having a light incident opening and a receiving space, wherein the light incident opening is successive to the receiving space; a first lens, arranged in the receiving space and having a first annular conical surface that is located at an outer rim of the first lens, wherein the light incident opening exposes a portion of the first lens; and a second lens, arranged in the receiving space and having a second annular conical surface that is located at an outer rim of the second lens, wherein the second lens is embedded with the first lens in a manner that the first annular conical surface is embedded with the second annular conical surface, further comprising a fixed plate arranged within the receiving space against the second lens, wherein a light outgoing opening is further formed on the fixed plate to expose a portion of the second lens.

4. The optical lens of claim 3, further comprising an image capturing device arranged on a light path behind the fixed plate.

5. The optical lens of claim 4, further comprising a sensor covering plate for covering onto the image capturing device arranged on a light path behind the fixed plate, wherein the sensor covering plate is arranged on a light path between the fixed plate and the image capturing device.

6. The optical lens of claim 4, further comprising a filter arranged on a light path between the fixed plate and the image capturing device.

7. The optical lens of claim 1, wherein materials of the first lens and the second lens are glass.

8. The optical lens of claim 1, wherein materials of the first lens and the second lens are plastic.

9. A design method for an optical lens, comprising: providing a computer analysis model for the optical lens, wherein the computer analysis model for the optical lens comprises at least a plurality of lenses and an image capturing device flat is located on a light path behind the lenses; projecting a reference image to the lenses to form an image on the image capturing device; analyzing the image to obtain a distribution of a useless light of the image and deducing a useless light reflection region of the lenses; and correcting an angle formed by an interface of the lenses and optical axes of the lenses to reduce a light strength of the useless light of the image.

10. The design method for the optical lens of claim 9, wherein the interface of the lenses of the computer analysis model is perpendicular to the optical axes of the lens.

11. The design method for the optical lens of claim 9, wherein correcting the angle formed by the interface of the lenses and the optical axes of the lenses comprises changing the interface of the lens to annular conical surfaces.

12. The design method for the optical lens of claim 9, wherein analyzing the image fixer comprises comparing the image and the reference image to obtain the useless light of the image.

* * * * *